United States Patent [19]

Puffer et al.

[11] Patent Number: 5,033,519

[45] Date of Patent: Jul. 23, 1991

[54] STORAGE TANK FLOW CONTROL VALVE

[75] Inventors: Rick E. Puffer, Muskegon; Leo J. LeBlanc, Bloomfield Hills; Robert P. Whitney; Elmer P. Klop, both of Grand Haven, all of Mich.

[73] Assignee: EBW, Inc., Muskegon, Mich.

[21] Appl. No.: 534,438

[22] Filed: Jun. 6, 1990

[51] Int. Cl.[5] ........................ B65B 57/06; F16K 31/08

[52] U.S. Cl. .................................... 141/198; 137/430; 137/423; 137/421; 251/212; 251/297; 141/200; 141/220; 141/205

[58] Field of Search ............... 141/198, 200, 201, 205, 141/217, 218, 220, 222, 223; 137/433, 589, 430, 423, 448, 421, 420; 251/212, 297, 66, 73, 74; 220/1 B, 86

[56] References Cited

U.S. PATENT DOCUMENTS

| | | | |
|---|---|---|---|
| 979,819 | 12/1910 | Anderson | 141/199 |
| 1,219,222 | 3/1917 | Baxter et al. | 141/205 |
| 1,246,033 | 11/1917 | Adams | 141/205 |
| 1,262,443 | 4/1918 | Cahill | 4/381 |
| 1,268,947 | 6/1918 | Fell | 141/205 |
| 1,289,490 | 12/1918 | Lundstrom | 141/205 |
| 1,312,531 | 8/1919 | Garbisch | 141/199 |
| 1,313,386 | 8/1919 | Jones | 141/205 |
| 1,360,869 | 11/1920 | Beliveau | 55/199 |
| 1,462,253 | 7/1923 | Tobiasson | 141/200 |
| 1,463,129 | 7/1923 | Milton | 141/220 |
| 1,689,066 | 10/1928 | Baxter | 141/220 |
| 1,859,009 | 5/1932 | Stetson | 137/423 |
| 1,892,455 | 12/1932 | Ayers | 166/54 |
| 1,978,314 | 10/1934 | Lancaster | 220/86 |
| 2,199,085 | 4/1940 | Smith | 137/139 |
| 2,299,360 | 10/1942 | Tharp | 137/448 |
| 2,340,936 | 2/1944 | Cook | 229/86 |
| 2,499,409 | 3/1950 | Norway | 62/1 |
| 2,685,891 | 8/1954 | Segelhorst | 137/614.16 |
| 2,705,372 | 4/1955 | Cornell | 33/126.7 |
| 2,811,179 | 10/1957 | Greenwood | 141/95 |
| 2,918,931 | 12/1959 | Siri | 137/211 |
| 2,918,932 | 12/1959 | Few | 137/211 |

(List continued on next page.)

FOREIGN PATENT DOCUMENTS

| | | |
|---|---|---|
| 620649 | 9/1927 | France . |
| 1360869 | 4/1963 | France . |
| 1444260 | 7/1976 | France . |
| 2331732 | 6/1977 | France . |
| 2355736 | 1/1978 | France . |
| 1531083 | 11/1978 | France . |

*Primary Examiner*—Henry J. Recla
*Assistant Examiner*—Keith Kupferschmid
*Attorney, Agent, or Firm*—Basile and Hanlon

[57] ABSTRACT

A float actuated valve for automatically shutting off the flow of fluid into a storage tank when the tank is filled to a predetermined level includes a pair of shutter plates movable transversely across the flow passage from an open position wherein the plates are retracted clear of opposite sides of the passage and a fully closed position in which the plates project into and cooperatively block the passage. A spring biased rotary trip plate underlying the shutter plates controls actuation of the shutter plates and may be held by first and second detents in rotative positions locating the shutter plates in the fully closed or a partially closed position. A lower float located within the tank releases the first detent to cause the trip plate to drive the shutter plates from the fully closed to the partially closed position when the level of fluid in the tank rises to a first level. Upon a further rise of the level of fluid in the tank at a reduced rate due to the partial closure of the shutter plates, an upper float releases the second detent to enable the trip plate to rotate under the biasing action of the spring to drive the shutter plates to the fully closed position. A latch mechanism operable by the upper float latches the trip plate against any substantial movement in a direction opening the shutter plates until the upper float is lowered by withdrawal of fluid from the tank. Upon release of the latch mechanism, a manually operable reset mechanism may be employed to fully open the shutter plates.

22 Claims, 6 Drawing Sheets

U.S. PATENT DOCUMENTS

| | | | |
|---|---|---|---|
| 3,189,039 | 6/1965 | Bauer | 137/434 |
| 3,347,263 | 10/1967 | Thompson | 137/448 |
| 3,438,316 | 4/1969 | Rodier | 95/64 |
| 3,495,635 | 2/1970 | Youinou | 137/433 |
| 3,563,263 | 2/1971 | Benson | 137/202 |
| 3,610,273 | 10/1971 | Russell | 137/513.3 |
| 3,661,175 | 5/1972 | Tillman | 137/517 |
| 3,787,022 | 1/1974 | Wilcox | 251/212 |
| 3,791,407 | 2/1974 | Nicholls | 137/512.15 |
| 3,794,077 | 2/1974 | Fanshier | 137/513.3 |
| 3,895,402 | 7/1975 | Page | 4/172.17 |
| 4.175,296 | 11/1979 | Goldman | 4/325 |
| 4,266,582 | 5/1981 | Sergent | 137/423 |
| 4,396,034 | 8/1983 | Cherniak | 137/514 |
| 4,407,325 | 10/1983 | Cherniak | 137/514 |
| 4,469,116 | 9/1984 | Hansen | 137/39 |
| 4,630,655 | 12/1986 | Fleischer et al. | 141/198 |
| 4,703,874 | 11/1987 | Tapperman et al. | 222/198 |

STORAGE TANK FLOW CONTROL VALVE

BACKGROUND OF THE INVENTION

The present invention is directed to a flow control valve operable to automatically stop the flow of fluid into a storage tank when the level of fluid within the tank rises to a predetermined level to prevent overfilling of the tank. The valve of the present invention is especially well adapted for use with underground gasoline storage tanks.

Underground gasoline storage tanks utilized at gasoline service stations are provided with a fill pipe which extends upwardly from the top of the tank to an inlet end located in a manhole in the service station apron. These tanks are filled from tank trucks by means of a large diameter hose which is sealingly coupled to the upper end of the fill pipe during the filling operation. Because of the relatively large capacity of the underground storage tanks—from 6,000 to 12,000 gallons—a relatively high flow rate during the filling operation is desirable and flow rates in the general range of 400 gpm are typical. At these high flow rates, it is quite common that the tank is overfilled and, upon uncoupling of the tank truck hose from the fill pipe, fuel within the hose spills into the manhole. As much as 35 gallons of fuel may be involved in such a spillage. To prevent this spillage from contaminating the soil, it is now required in many localities that the fill pipe be equipped with an overfill storage container, such as that disclosed in U.S. Pat. No. 4,793,387. However, prevention of overfilling of the tank is obviously the most desirable solution.

Monitoring of the fuel level within the tank during the filling operation presents a problem in that the sole access to the interior of the tank is via the fill pipe. Various sensing devices which will give a continuous reading of the fuel level within the tank during the filling operation have been proposed, however, typically these devices merely give a gauge reading to the fuel delivery man, who may not be paying close enough attention.

Various float actuated control arrangements have been proposed in the prior art in which a valve in the fill pipe inlet is shifted to a closed position by a float within the tank when the level of fuel within the tank elevates the float to a position at which the float causes the valve to close. U.S. Pat. No. 4,667,711 discloses various forms of such float controlled valves. As set forth in U.S. Pat. No. 4,667,711, one problem which confronts valves of this type is that of devising an arrangement which will enable the float and the mechanism coupling the float to the valve which will enable the float and its associated mechanism to be inserted into the storage tank through the storage tank fill pipe. In order to perform its function, when the float is in its operating position within the storage tank, it must be located at some position outside of the path of incoming fuel flow—i.e., offset from the fill pipe. A second problem, largely ignored by the prior art, including U.S. Pat. No. 4,667,711, is the water hammer effect produced by suddenly closing a valve in a flow passage through which fluid is flowing at rates in the order of 400 gpm. This problem is especially acute in the various forms of valves disclosed in U.S. Pat. No. 4,667,711 in that a valve plate is pivoted about a horizontal axis at one side of the flow passage, and upon actuation, the valve is shifted into the flow path and driven to its seat by the incoming flow.

A third problem presented by such float controlled valves is the fact that upon closure of the valve, the flow passage above the closed valve is filled with fuel which will spill when the tank truck hose is uncoupled from the fill pipe. This problem has been solved by overfill storage containers, such as that disclosed in U.S. Pat. No. 4,793,357. Excess fuel which spills into the overfilled container may be drained into the fill pipe, as by a manually actuated valve—see, for example, U.S. Pat. No. 4,793,357, assuming the float is so arranged as to actuate the valve when the storage tank is filled to about 95% of is capacity.

The present invention is directed to a float actuated valve assembly which is readily insertable into and removable from an existing underground storage tank fill pipe in a manner such that the float and associated valve actuating mechanisms are shielded from incoming fuel flow and in which water hammer effects generated by valve closure are minimized.

SUMMARY OF THE INVENTION

A float actuated valve assembly embodying the present invention includes a housing having a flow passage extending vertically through the housing and opening at its lower end into the interior of a vertically elongated hollow drop tube which constitutes a downward extension of the flow passage. A pair of hollow tubular floats are slidably mounted on the exterior of the drop tube near its lower end, one above the other.

Within the housing, an annular trip plate is mounted for rotation about the vertical central axis of the flow passage, the flow passage extending downwardly through the trip plate. A pair of shutter-like valve members are mounted in the housing for pivotal movement about vertical axes across the top of the trip plate between an open position clear of opposite sides of the flow passage through the trip plate and a closed position in which the shutter plates overlie and block the flow passage through the trip plate. Drive pins on the shutter plates are received in slot-like recesses in the bottom of the trip plate to drive the shutter plates between the open and closed position in response to rotation of the trip plate about the axis of the flow passage.

The trip plate is rotatively biased by a spring in a direction of rotation which would result in closing movement of the shutter plates. The trip plate is normally held in a rotative position locating the shutter plates in their open position by a detent coupled via a lever and push rod to the lower of the two floats to be released when the lower float rises to a predetermined elevation on the drop tube. Upon release of this detent, the trip plate rotates through an angle such that the shutter plates are driven to a partially closed position which reduces, but does not completely block, the flow of fuel through the valve. The trip plate is held in the rotative position representative of this partial closure of the shutter plates by a second detent which projects from the housing into a circumferentially extending slot in the bottom of the trip plate, the circumferential extent of the slot being representative of the rotary movement of the trip plate between its valve open and valve partially closed positions. This second detent is coupled by a lever and push rod arrangement to the upper of the two floats. After partial closure of the valve, the level of fuel within the storage tank will continue to rise until it elevates the upper float a distance sufficient to withdraw the second detent from the trip plate slot. Withdrawal of the second detent permits the trip plate to rotate an additional amount effective to drive the shutter plates to their fully closed position. At this time, the upper end of the push rod carried by the upper float projects upwardly from the housing into a latching recess in the trip plate to lock the trip plate against rotation until the level of fuel within the tank falls to a level which withdraws the upper end of the push rod from the latching recess.

A manually actuable reset mechanism is employed to restore the trip plate to its original valve open position.

Other objects and features of the invention will become apparent by reference to the following specification and to the drawings.

DESCRIPTION OF THE PREFERRED EMBODIMENT

Figure 1:
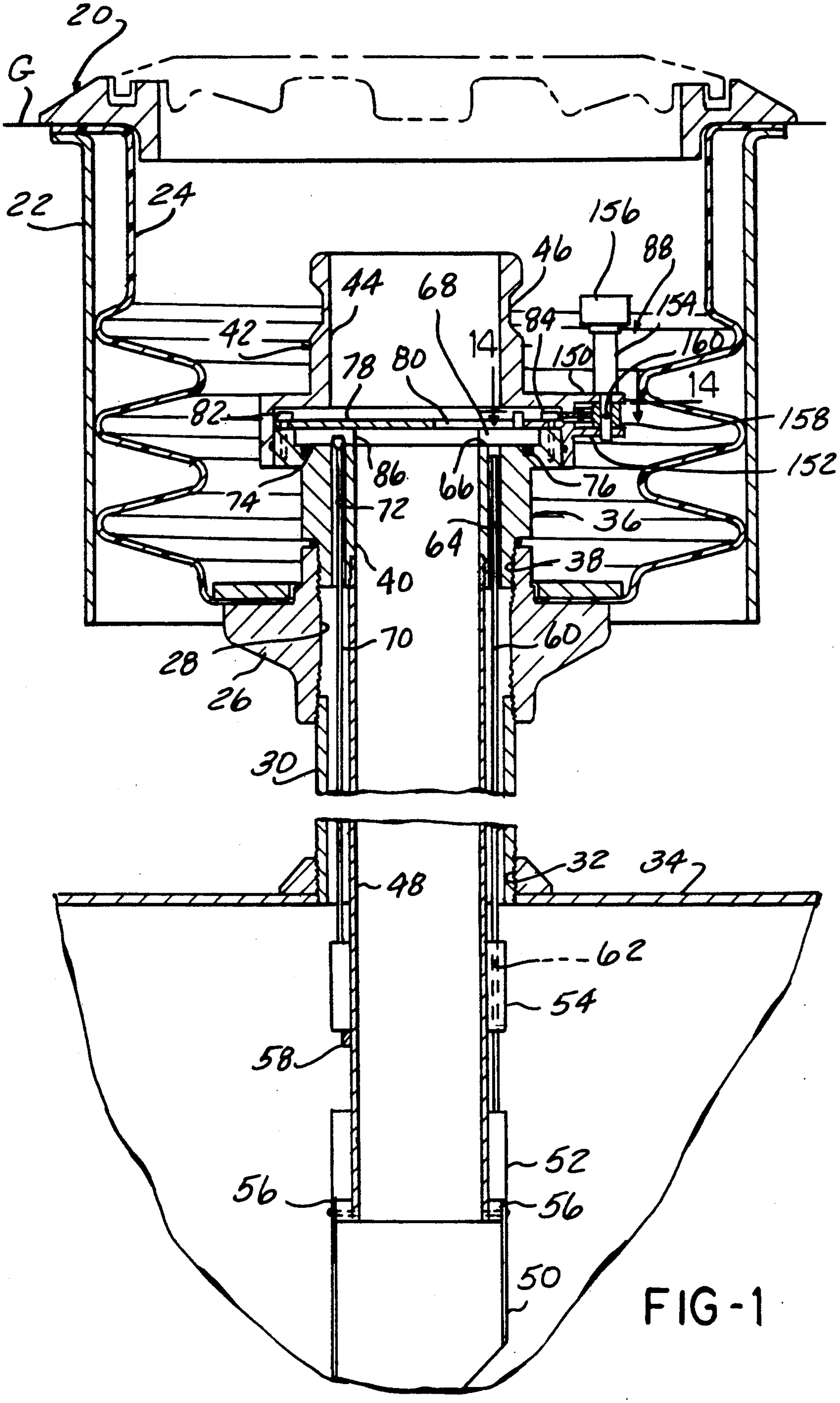
FIG. 1 is a cross sectional view taken on a vertical plane showing a float actuated valve assembly embodying the present invention, certain parts being broken away.

Referring first to FIG. 1, there is shown in vertical section portions of an underground gasoline storage tank installation employing a float actuated valve embodying the present invention. Conventional portions of the overall installation include a manhole rim designated generally 20 located at ground level G and an open ended hollow cylindrical skirt 22 extending coaxially downwardly from rim 20 into the ground to define the sidewalls of the manhole. An open ended hollow tubular overfill spill container 24 is sealed at its upper end to the underside of rim 20 and projects downwardly through the interior of the skirt 22. The sidewall of container 24 is of bellows shaped configuration to accommodate axial compression or extension for purposes set forth in Pat. No. 4,793,387 to which reference may be had for further details of a spill container of the type illustrated. An adapter 26 is sealingly coupled to the lower end of container 24 and formed with a central bore 28. A fill pipe 30 is threaded into the lower end of bore 28 and adapter 26 and extends vertically downwardly through the ground to a lower end which is vertically sealed as at 32 within an opening in the top 34 of an underground fuel storage tank. The structure described thus far is conventional and known in the prior art, further details of the spill container are set forth in U.S. Pat. No. 4,793,387.

A valve assembly embodying the present invention includes a lower housing designated generally 36 which is threadably received as at 38 in the upper end of adapter 26 and formed with a central bore 40. An upper housing designated generally 42 is sealingly mounted upon and projects upwardly from the upper end of lower housing 36 and is formed with a central bore 44. At its upper end, upper housing 42 is formed with an external annular recess 46 conformed to receive coupling cams mounted on a tank truck hose coupling to sealingly couple the hose (not shown) to the upper end of upper housing 42 with the interior of the hose in direct fluid communication with bore 44.

A vertically elongate hollow tubular drop tube 48 is threadably coupled at its upper end into bore 40 of lower housing 36 and projects downwardly from housing 36 freely through the interior of fill pipe 30 to an open lower end 50 located within and well below the top of storage tank 34. Bore 44 in upper housing 42, bore 40 in lower housing 36 and the interior of drop tube 48 cooperatively define a flow passage through which fuel may flow into the interior of tank 34 during a tank filling operation.

A pair of hollow tubular floats 52, 54 are slidably mounted on the exterior of drop tube 48 to be located within the interior of storage tank 34 when the valve assembly is installed. The outer diameters of floats 52, 54 and the maximum outer diameter of drop tube 48 are less than the interior diameter of fill pipe 30 so that the drop tube and floats can be freely passed through fill pipe 30 during installation or removal. The lower float 52 normally rests on a stop 56 and the lower end of the upper float 54 likewise normally rests upon a stop 58, both stops 56 and 58 being fixedly mounted upon drop tube 48.

A first push rod 60 is fixedly secured at its lower end to lower float 52 and projects vertically upwardly freely through a vertical bore 62 in upper float 54 and into a vertical bore 64 in lower housing 36. Bore 64 extends upwardly from the bottom of the housing to open into the interior of housing 36 through a horizontal shoulder 66 which defines the bottom of an annular recess in the upper end of lower housing 36. An annular trip plate 68, coaxial with bore 40, is received within the recess whose bottom is defined by shoulder 66 for rotation relative to lower housing 36 about the axis of bore 40.

A second push rod 70 is fixedly secured to the upper float 54 and projects vertically upwardly from the upper float into a vertical bore 72 in lower housing 36, the bore 72 extending upwardly from the lower end of housing 36 to open at its upper end through horizontal shoulder 66.

A second recess 74 extends downwardly into housing 36 from shoulder 66 beneath trip plate 68. Recess 74 is a circumferential recess and extends entirely around the axis of bore 40. A coil spring 76 is received within recess 74 for a purpose to be described in greater detail below.

A pair of shutter plates 78, 80 are pivotally mounted upon the top of lower housing 36 respectively by pivot pins 82, 84 threadably mounted in lower housing 36 at diametrically opposite sides of the housing. The lower surfaces of shutter plates 78, 80 rest upon the upper surfaces of trip plate 68. As will be explained below, rotational movement of trip plate 68 about the axis of bore 40 pivots shutter plates 78, 80 between an open position in which the shutter plates are located clear of the central bore 86 through trip plate 68 and a closed position in which the shutter plates overlie and block the flow of fluid through bore 86 of trip plate 68.

Each of shutter plates 78 and 80 includes a drive pin (FIG. 10), which projects downwardly from the shutter plates into a slot formed in the upper surface of trip plate 68 to open and close the shutter plates in response to rotation of trip plate 68 in a manner to be described in greater detail below.

A reset mechanism designated generally 88 is mounted upon upper housing 42. Structural details and the functioning of reset mechanism 88, will be described in greater detail below.

Figure 2:
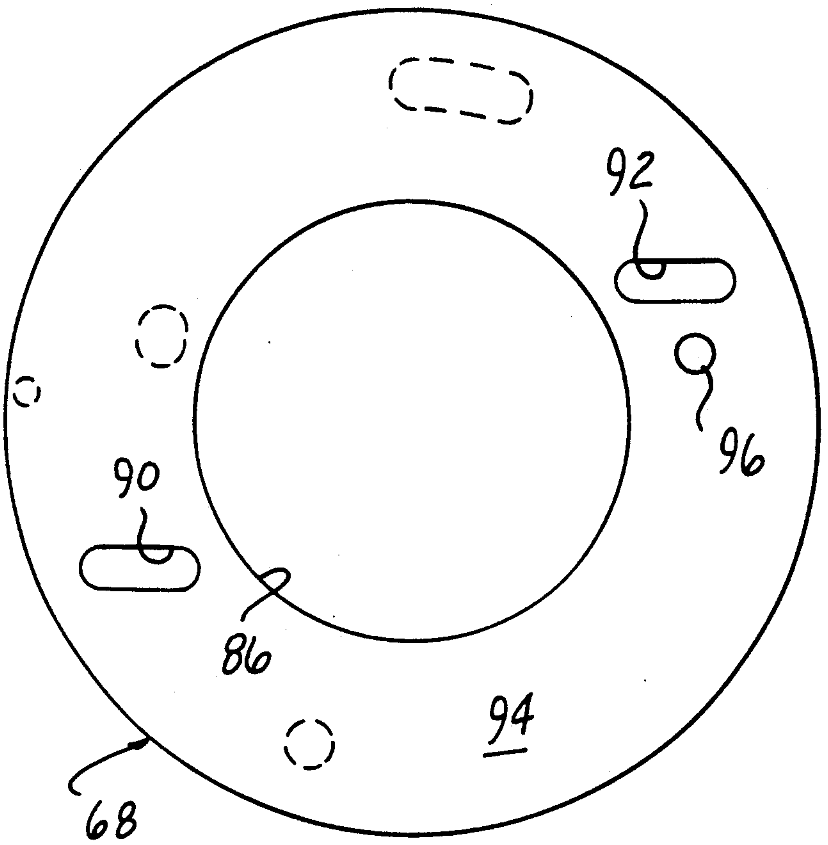
FIG. 2, is a top plan view of the trip plate.
Figure 3:
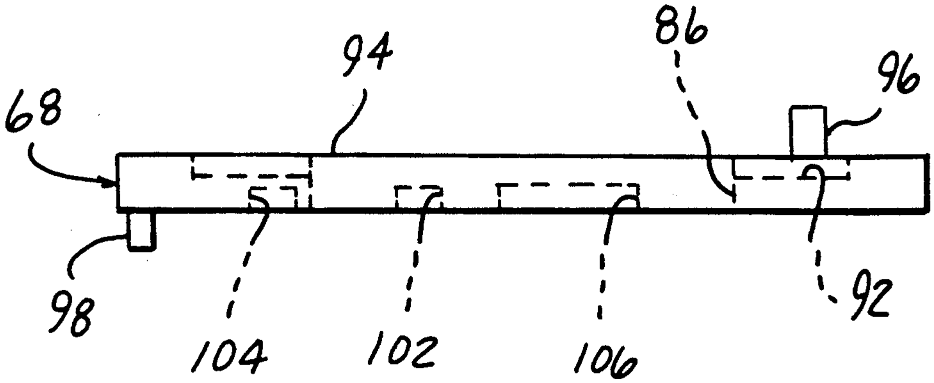
FIG. 3, is a side view of the trip plate.
Figure 4:
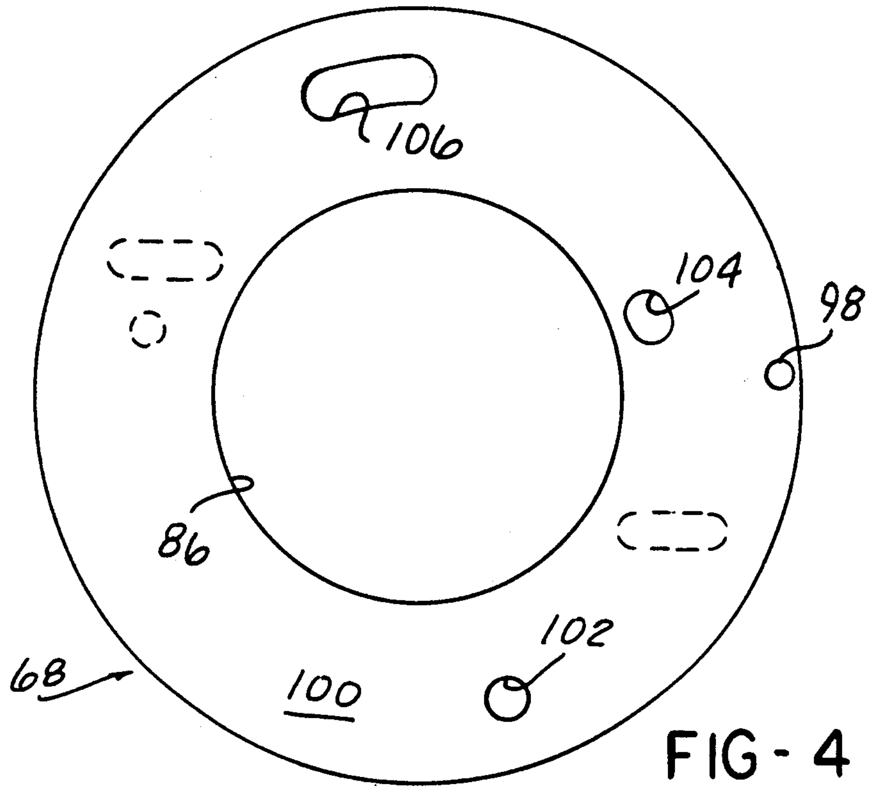
FIG. 4, is a bottom view of the trip plate.

Details of trip plate 68 are best seen in FIGS. 2–4. Referring first to FIG. 2, which is a top plan view of the trip plate, it is seen that a pair of slot like recesses 90, 92 are formed in the upper surface 94 of shutter plate 68 at diametrically opposed positions. Slots 90, 92 receive drive pins which project downwardly from the respective shutter plates 78, 80 in a manner to be described below. A reset pin 96 projects upwardly from upper surface 94 of trip plate 68.

Referring now to FIG. 4, which is a bottom view of shutter plates 68, a pin 98 is fixedly secured to trip plate 68 to project downwardly from the bottom surface 100 of the trip plate into the circumferential recess 74 in housing 36.

Three recesses are formed in bottom surface 100 of trip plate, the first of these recesses 102 being in the form of a circular bore 102 which functions, in a manner to be described below, to receive a detent actuated by the lower float push rod 60 to latch the trip plate in its normal or cocked position.

A second recess 104 in the bottom of trip plate 68 takes the form of a slightly circumferentially elongated slot. Slot 104 will receive, in a manner to be described below, the upper end of upper float push rod 70 to latch the trip plate in a valve closed position.

The third recess 106 in bottom surface 100 of trip plate 68 is in the form of a circumferentially elongated slot, substantially longer than the elongation of slot 104. Slot 106 cooperates with a detent actuated by upper float push rod 70, in a manner to be described in greater detail below, to establish the rotative position of trip plate 68 corresponding to a partially closed position of shutter plates 78, 80.

Figure 5:
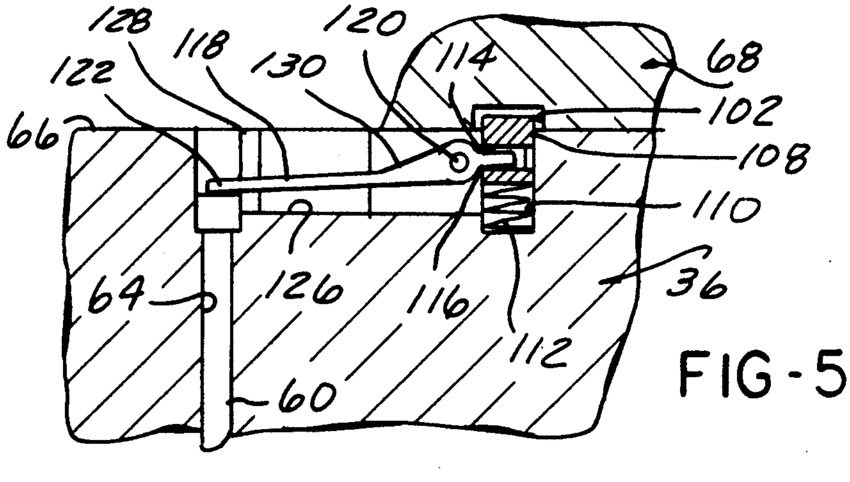
FIG. 5 is a detail cross sectional view showing details of the lower float actuated detent mechanism.

Referring now to FIG. 5, there is shown a detailed cross sectional view showing the cooperative relationship between a detent 108 mounted in a bore 110 extending downwardly into lower housing 36 from shoulder 66 and the detent receiving bore 102 in trip plate 68. Detent 108 is biased upwardly within bore 110 by a compression spring 112 and is formed with a passage 114 extending diametrically through the detent, which passage receives one end 116 of a lever 118 pivotally mounted upon lower housing 36 by a pivot pin 120. The opposite end 122 of lever 118 projects into bore 64 above the upper end of lower float push rod 60. When lower float 52 is in its lowered or unactuated position as illustrated in FIG. 1, lever 118 assumes the position shown in FIG. 5 in which the upper end of detent 108 projects above the surface of shoulder 66 and into the detent receiving bore 102 in the lower surface of trip plate 68. It is believed apparent that if lower float 52 is moved upwardly by a rising level of fuel within tank 34, push rod 60 will likewise be moved upwardly to elevate the end 122 of lever 118 and also simultaneously depress the opposite end 116 of the lever to drive detent 108 downwardly into bore 110 clear of the lower surface of trip plate 68 to release the detent 108 from bore 102.

Figure 6:
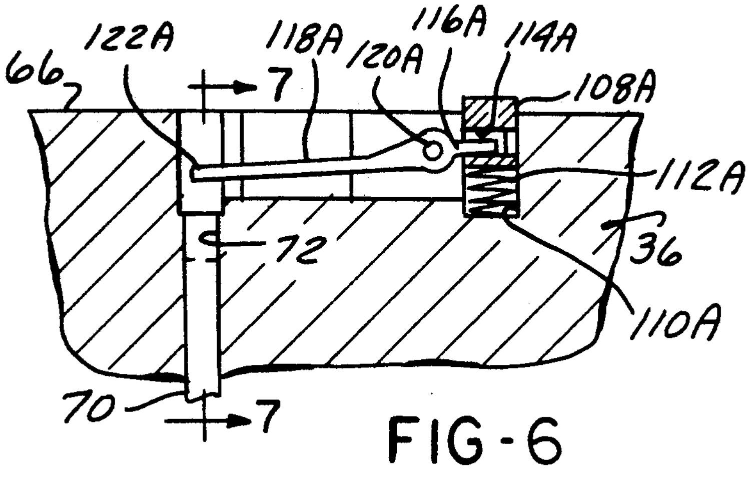
FIG. 6 is a detailed cross sectional view showing details of the upper float actuated detent mechanism.
Figure 7:
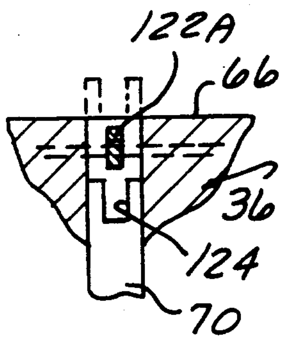
FIG. 7 is a detailed cross sectional view taken on line 7—7 of FIG. 6.

Referring now to FIGS. 6 and 7, a slightly modified detent actuating arrangement is employed in conjunction with upper float push rod 70. The structure of the detent 108A and lever 118A of FIGS. 6 and 7 is substantially identical to that of the detent 108, lever 118, etc., of FIG. 5, and similar reference numerals with the subscript A in FIG. 6 and 7 identified corresponding structure described above in connection with FIG. 5. The difference between the arrangement of FIG. 5 and that of FIGS. 6 and 7 is that the upper end of push rod 70 is formed with a diametrical slot 124 of a depth greater than the thickness of the end 122A of the lever which projects into bore 72. Upon elevation of upper float 54 in response to a rising level of fuel within tank 34, push rod 70 moves upwardly in bore 72. When the end 122A of the lever is engaged by the bottom of slot 124 in push rod 70, further upward movement of push rod 70 will cause the lever to withdraw detent 108A downwardly below the surface of shoulder 66 of housing 36, thus withdrawing detent 108A clear of slot 106 (FIGS. 3 and 4) in the bottom of the trip plate (not shown in FIGS. 6 and 7). Further upward movement of push rod 70 will cause the upper end of push rod 70 to project upwardly above surface 66, and, as will be described below, the upper end of push rod 70 will project into the recess 104 (FIG. 4) in the bottom of the trip plate to act as a locking pin latching trip plate 68 against rotational movement.

Figure 8:
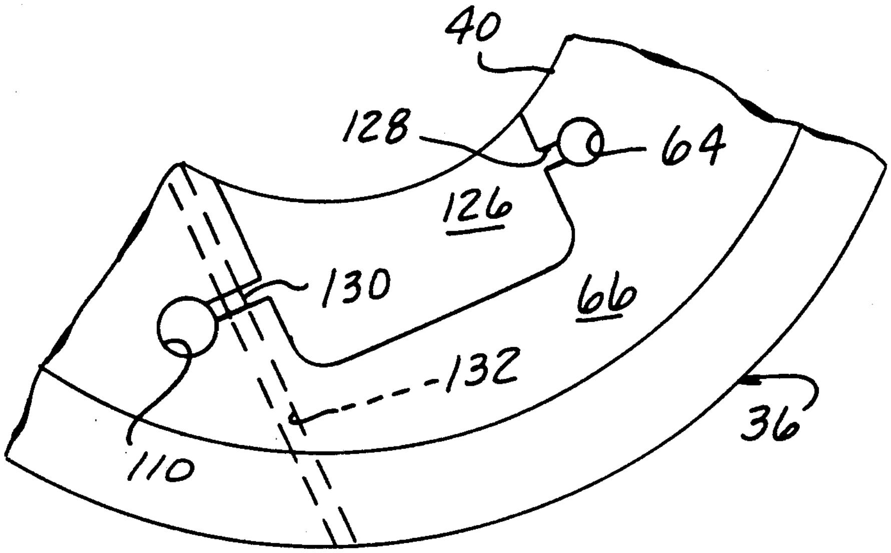
FIG. 8 is a top plan view of a portion of the lower housing.

The manner in which levers 118, 118A are mounted in lower housing 36 is best seen from a comparison of FIGS. 5 and 8. FIG. 8 shows a top plan view of that portion of the housing in which lever 118 is mounted, with the lever removed. Lower housing 36 is formed with a recess 126 which extends downwardly between push rod bore 64 and detent bore 110. Aligned slots 128, 130 extend from recess 126 to radially intersect the bores 64, 110 respectively. As best seen in FIG. 8, the longitudinal center line of slots 128, 130 lie on a line connecting the axes of bores 64 and 110. Lever 118 (FIG. 5) is loosely received within the slots, which extend downwardly from the surface of shoulder 66 to the bottom of recess 126. A pivot pin receiving bore 132 is drilled through housing 36 to intersect and pass through slot 130 to receive the pivot pin 120 (FIG. 5) which mounts the lever 118 upon housing 36. A similar arrangement is employed to mount lever 118A.

Figure 9:
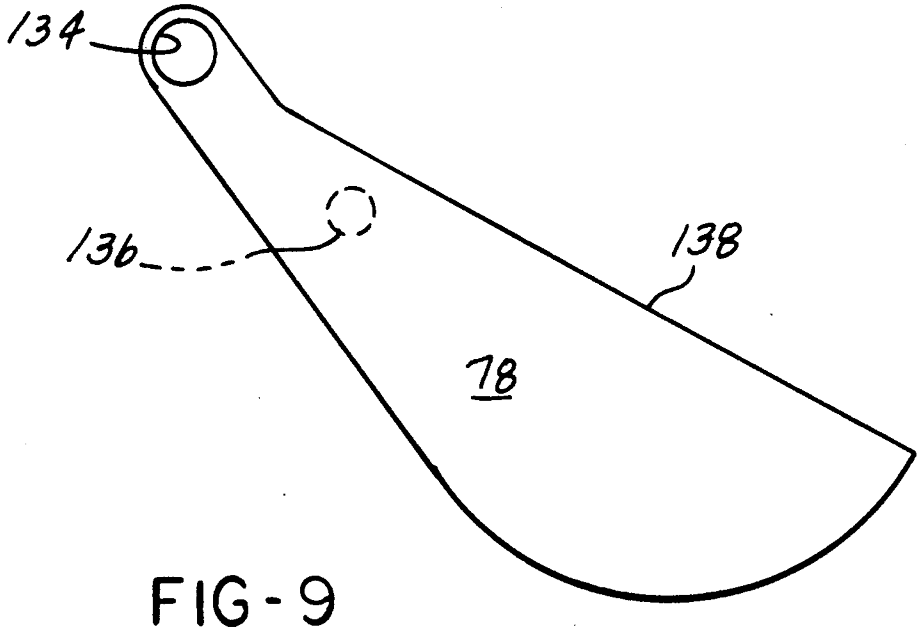
FIG. 9 is a top plan view of one of the shutter plates.
Figure 10:
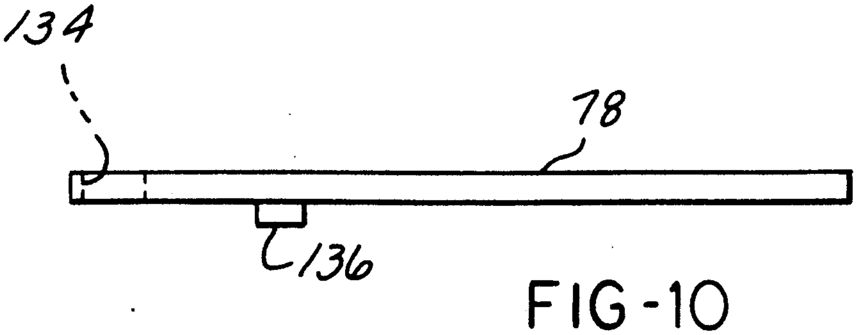
FIG. 10 is a side view of the shutter plate.

Shutter plate 78 is shown in FIGS. 9 and 10. Plate 78 is formed at one end with a bore 134 for receiving pivot pin 82 (FIG. 1) and a drive pin 136 is fixedly secured to and projects downwardly from the bottom surface of shutter plate 78. Plate 78 is formed with a straight edge 138 which extends along a line radial to and intersecting the axis of its pivot pin receiving bore 134.

Shutter plate 80 is of a construction identical to that of shutter plate 78.

Figure 11:
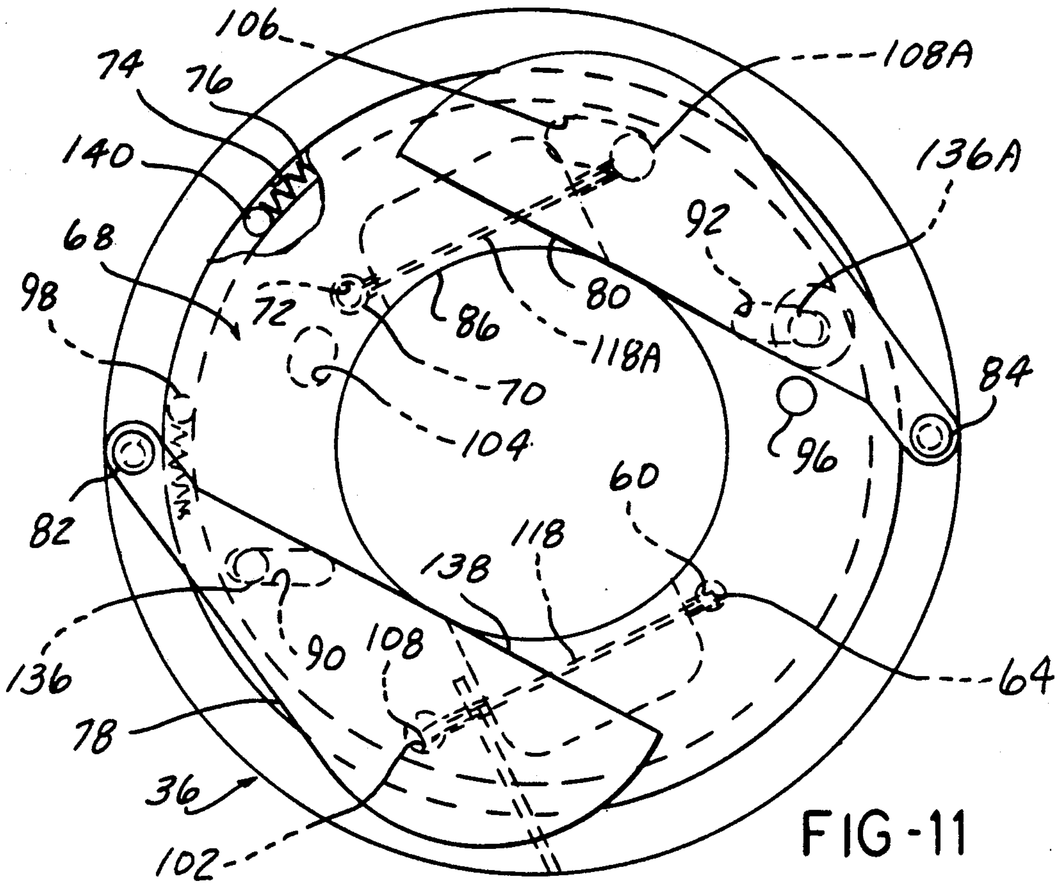
FIG. 11 is a top plan view of the shutter plates, trip plate and lower housing showing the shutter plates in their open position.
Figure 12:
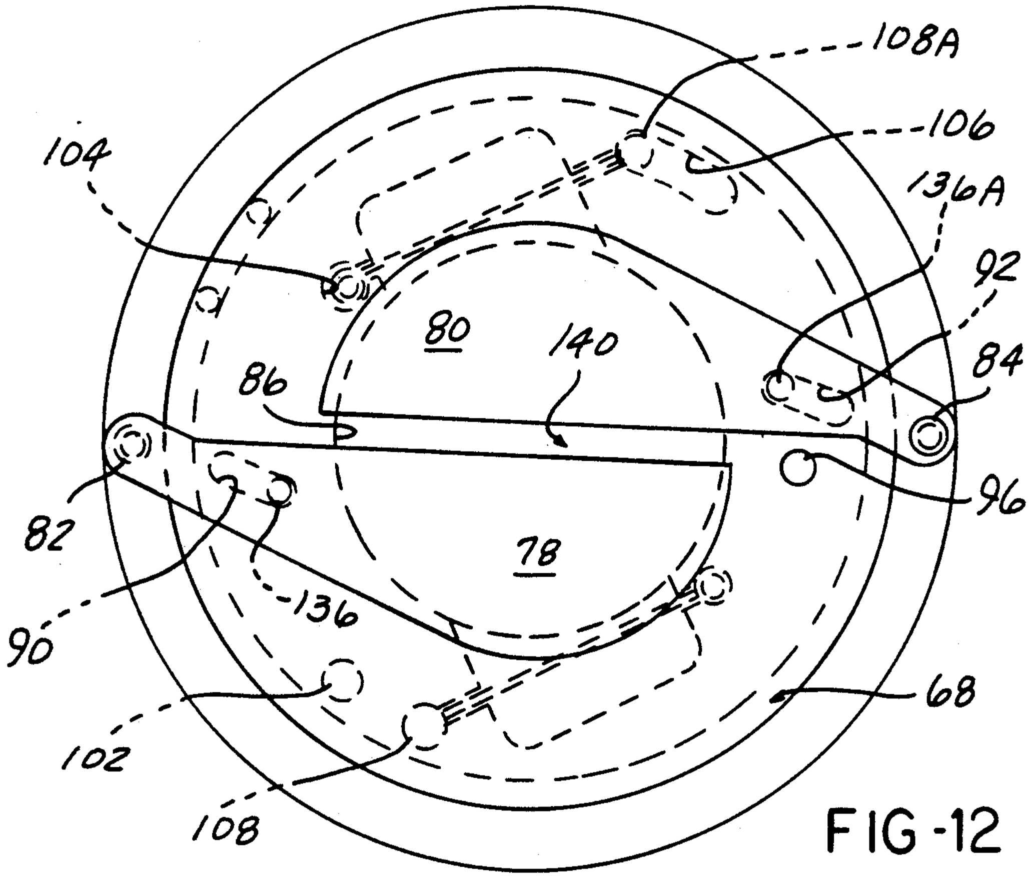
FIG. 12 is a top plan view, similar to FIG. 11, showing the shutter plates in their partially closed position.
Figure 13:
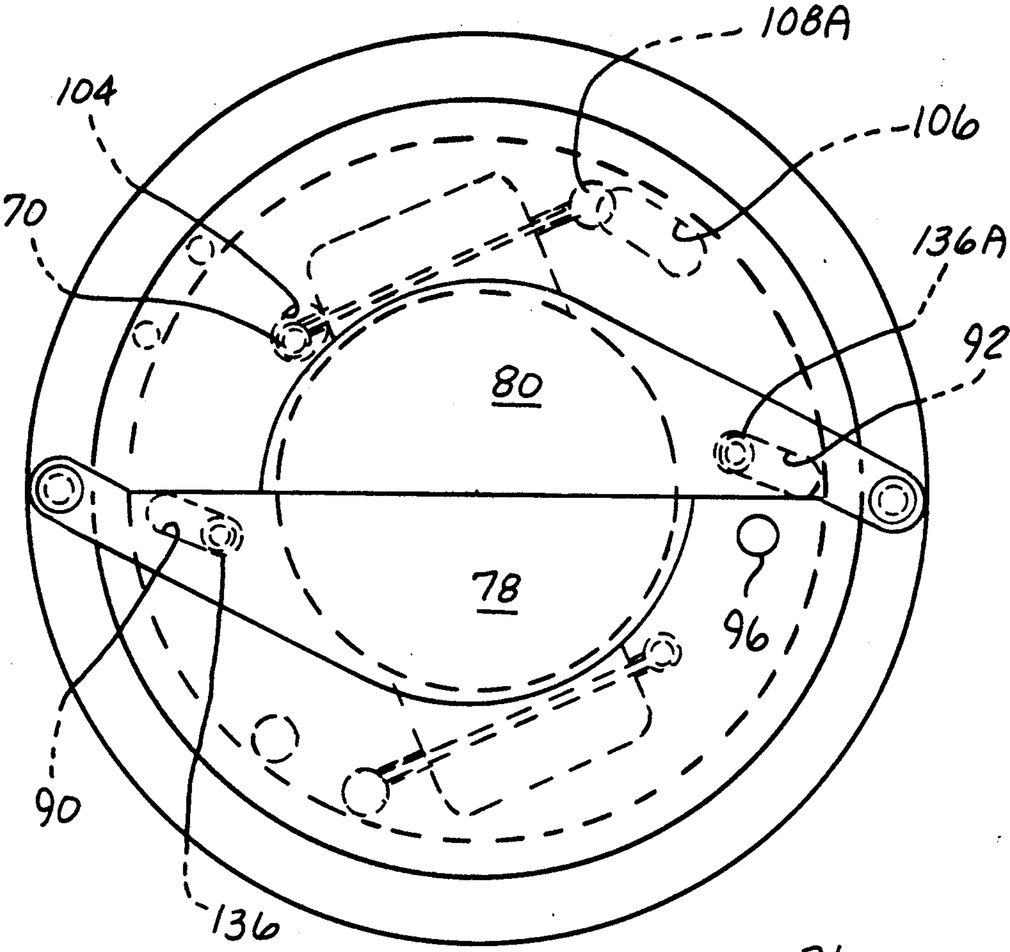
FIG. 13 is a top plan view, similar to FIG. 11, showing the shutter plates in their fully closed position.

Operation of the trip plate 68 and shutter plates 78, 80 is best understood by reference to FIGS. 11–13, which are top plan views of the housing assembly as shown in FIG. 1 with upper housing 42 removed.

FIG. 11 shows the shutter plates in their fully opened position in which the shutter plates 78, 80 are pivoted to positions clear of bore 86 through trip plate 68. As viewed in FIG. 11, trip plate 68 is biased in a clockwise direction of rotation by spring 76 which is seated at one end against a stop pin 140 fixedly mounted in circumferential groove 74. Spring 76 extends in a clockwise direction from stop pin 140 along the circumferential groove 74 to its opposite end which abuts against spring pin 98 which is fixed to and projects downwardly from the bottom surface of trip plate 68.

In FIG. 11, it will be assumed that both lower 52 and upper 54 floats are in their lower most positions, as shown in FIG. 1, indicating that the tank 34 is not full. With lower float 52 in its lower position, the lower float push rod 60 will be in the lower position shown in FIG. 5, and thus detent 108 will be in the elevated position shown in FIG. 5 in which detent 108 projects upwardly above the surface of shoulder 66 to be received within the detent bore 102 in the bottom of trip plate 68. The engagement of detent 108 in trip plate bore 102 rotatively locks the trip plate in the rotative position shown in FIG. 11 against the clockwise biasing force exerted on the trip plate by spring 76.

At this time, the detent 108A, which is operated by the push rod 70 of upper float 54 likewise projects upwardly above the surface of shoulder 66 and into the circumferentially elongated groove 106 in the bottom of trip plate 68. The shutter plate pins 136, 136A of shutter plate 78 and 80 project downwardly into the respective grooves 90, 92 formed in the upper surface of trip plate 68, and it is the engagement of the pins 136, 136A in the grooves 90, 92 which locate the shutter plates 78 and 80 in the position shown.

With the shutter plates 78, 80 in the position shown in FIG. 11, filling of tank 34 can proceed with a maximum rate of flow of fuel into the tank through the fully opened passage downwardly through the central bore 86 of trip plate 68. When the level of fuel within tank 34 rises to a level sufficient to lift lower float 52 upwardly, this upward movement of float 52 in turn elevates lower float push rod 60 to swing lever 118 (FIG. 5) in a clockwise direction about its pivot 120, thereby retracting detent 108 downwardly into detent bore 110. When detent 108 is retracted downwardly clear of bore 102 in trip plate 68, the trip plate is now free to rotate in a clockwise direction from the position shown in FIG. 11 to the rotative position shown in FIG. 12. The amount of clockwise rotation of trip plate 68 which occurs upon the disengagement of detent 108 is limited by the circumferential extent of the groove 106 and the engagement of detent 108A with an end of groove 106. Detent 108A is still in its elevated position because, at this time, the level of fuel in the tank has not yet reached upper float 54, hence, push rod 70 of upper float 54 has not yet engaged lever 118A, which is in the position shown in FIG. 6 at this time. Thus, the engagement of detent 108A with the counterclockwise end of slot 106 prevents rotation of trip plate 68 in a clockwise direction beyond the position shown in FIG. 12.

The foregoing rotation of trip plate 68 between the position shown in FIG. 11 and that shown in FIG. 12 carries with it the grooves 90, 92 in the upper surface of plate 68, and the walls of grooves 90, 92 shift the drive pins 136, 136A of shutter plates 78 and 80 relative to their stationary pivot axes 82, 84, to pivot shutter plates 78, 80 to the position shown in FIG. 11. In FIG. 11, the opposed straight edges of the shutter plates are spaced from each other, thus leaving a restricted passage 140 (FIG. 12) for the flow of fuel downwardly past the shutter plates and through central bore 86 in trip plate 68. The cross sectional area of this restricted passage 141 preferably is roughly about 10% of the cross sectional area of passage 86, thus with shutter plate 78, 80 in the position shown in FIG. 12, the rate of flow of fuel into tank 34 is substantially reduced.

With shutter plates 78, 80 in the position shown in FIG. 12, the level of fuel within tank 34 will continue to rise until it elevates upper float 54 from the lowered position of this float shown in FIG. 1. Upward movement of upper float 54 will drive push rod 70 upwardly until the bottom of slot 124 in the upper end of push rod 70 engages lever 118A (FIGS. 6 and 7). Continued upward movement of push rod 70 will pivot lever 118A to retract detent 108A from groove 106 in trip plate 68, thereby releasing the trip plate for further clockwise rotation under the action of biasing spring 76. As detent 108A is retracted below the surface 66 of housing shoulder 36, the upper end of push rod 70 begins to project upwardly above surface 66 into the slightly elongated recess 104 in the bottom of trip plate 68. Clockwise rotation of trip plate 68 from the position shown in FIG. 12 to that of FIG. 13 is positively limited by the engagement of the opposed straight edge portions of shutter plates 78, 80 and the engagement of the shutter plate pins 136, 136A with grooves 90, 92 in the shutter plate. The engagement of the upper end of rod 70 in recess 104 of shutter plate 68 will limit any attempt to manually rotate shutter plate 68 in a counterclockwise (shutter plate opening) direction from the position shown in FIG. 13 until the level of fuel within tank 34 has dropped a sufficient distance to allow the upper float to retract push rod 70 downwardly clear of recess 104. It is believed apparent that with the shutter plate 78, 80 in the position shown in FIG. 13, flow of fuel downwardly through trip plate 86 is blocked completely.

To restore shutter plates 78, 80 from the fully closed position shown in FIG. 13, to the fully opened position shown in FIG. 11, it is necessary to manually actuate reset device 88 (FIG. 1) at sometime after sufficient fuel has been withdrawn from the tank to disengage the upper end of upper float push rod 70 from recess 104 in the trip plate. Details of the reset mechanism 88 are best seen in FIGS. 1 and 14.

Referring first to FIG. 1, it is seen that a pair of vertically spaced horizontal webs 150, 152 are integrally formed upon and project outwardly from upper housing 42. A shaft 154 is rotatably received within aligned bores through webs 150, 152 and a suitable handle 156 is fixedly secured to the upper end of shaft 154. A crank arm 158 is received upon shaft 154 between webs 150, 152 and is rotatably locked to the shaft as by a pin 160.

Figure 14:
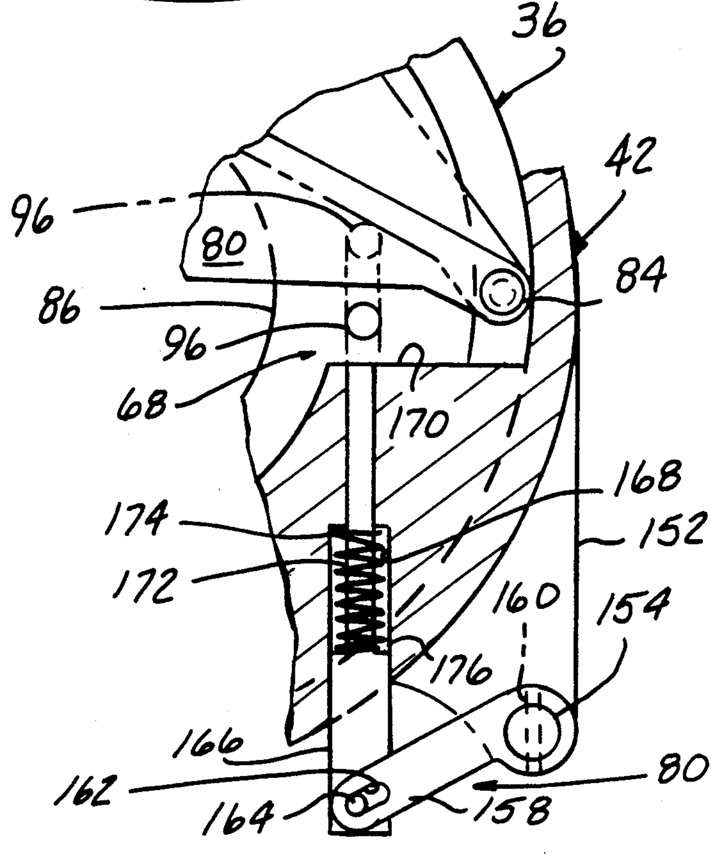
FIG. 14 is a detailed cross sectional view of a portion of the reset mechanism taken on line 14—14 of FIG. 1.

As best seen in FIG. 14, the distal end of crank arm 158 is formed with an elongated slot such as 162 which receive a coupling pin 164 fixedly mounted upon the end of an elongate plunger 166. The plunger 166 is slidably received within a stepped bore 168 in lower housing 42 which opens into the interior of housing 42 through a wall 170 of the housing. A compression spring 172 is engaged between a shoulder 174 of bore 168 and a shoulder 176 on plunger 66 to resiliently bias the plunger outwardly of housing 42. The inner end of the plunger 166 is aligned with reset pin 96 of trip plate 68 when the trip plate is in the valve closed position of FIG. 12. From FIG. 14, it is believed apparent that upon manually induced rotation of shaft 154 in a clockwise direction as viewed in FIG. 14, plunger 166 will be driven to the broken line position shown in FIG. 14 to drive the trip plate reset pin 96, and hence, the reset plate in a counterclockwise direction as viewed in FIG. 14 to thereby restore the trip plate to the FIG. 11 position. The trip plate will be held in the FIG. 11 position only if the level of fuel within tank 34 is low enough so that lower float 52 has returned to the lower most position shown in FIG. 1.

From the foregoing, it is seen that the valving arrangement described above provides a two stage float actuated shutoff. Typically, the initial partial closure of the valve initiated by the rising of the lower float maybe set to occur when the tank is, for example, about 90% full. Because the shutter plates are not fully closed by the partial closure, the water hammer effect arising from the partial reduction of the flow is not as intense as that which would be induced by a complete closure. The subsequent full closure of the valve in response to elevation of the upper float blocks only a relatively small flow of fuel so that an intense water hammer effect at full closure is avoided.

Once the full closure has been effected by a rise of the upper float to a level at which its push rod 70 projects into the latching recess 104 of the trip plate, the trip plate is locked against rotation in a valve opening direction beyond a relatively small distance from the fully closed position (established by the circumferential extent of recess 104) so that the shutter plates could, by manual actuation of the reset mechanism 88 be partially opened (i.e., position shown in FIG. 12). This feature might be employed to enable the delivery man to shut off the tank truck delivery valve, and then by a partial opening of the shutter plates by manipulation of the reset mechanism, drain the hose into the storage tank. However, any fuel delivery into the tank after the upper float has been elevated requires that the reset mechanism be manually held in an open position, and thus, inadvertent overfilling is not possible. Actuation of the valve to its fully closed position by upper float 54 when the tank is approximately 95% filled provides a reasonable volume within the tank to accommodate for thermal expansion of the tank contents. The valve will remain latched closed until sufficient fuel has been dispensed from the tank to restore the upper float to its lower end limit, at which time the upper end of the upper float push rod 70 is released from the trip plate. However, it is not possible to reset the shutter plates and maintain them in their fully open position until the level of fuel within the tank has been further drawn down to a point where the lower float has been restored to its lowered position to permit detent 108 to latch the trip plate in its fully open position against the biasing action of spring 76.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

What is claimed is:

1. For the use in combination with an underground fuel storage tank having a fill pipe extending upwardly from the top of said tank, a float actuated flow control valve for stopping the flow of fuel into said tank via said fill pipe when the level of fuel within said tank rises to a predetermined level, said valve comprising a housing adapted to be fixedly and sealingly coupled to the upper end of said fill pipe and having a flow passage extending vertically through said housing, an elongate open ended drop tube fixedly secured at its upper end to said housing and extending vertically downwardly from said housing to establish a downward continuation of flow passage, said drop tube having an outer diameter less than the inner diameter of said fill pipe and a length sufficient to extend entirely through said fill pipe to a lower end located within the interior of said tank when said housing is mounted on said fill pipe, an open ended hollow cylindrical float slidably received on the lower end of said drop tube and having an outer diameter less than the inner diameter of said fill pipe, a pair of shutter plates mounted in said housing for movement in a horizontal general plane between an open position wherein said plates are retracted clear of said flow passage and a closed position wherein said plates extend across said flow passage to block flow therethrough, and plate positioning means operable in response to movement of said float upwardly on said drop tube beyond a preselected position to shift said plates from said open position to said closed position.

2. The invention defined in claim 1 wherein said plate positioning means comprises detent means operable when engaged to retain said shutter plates in said open position, biasing means biasing said plates toward said closed position, and means on said float for disengaging said detent means upon movement of said float upwardly beyond said preselected position to enable said biasing means to drive said plates to said closed position.

3. The invention defined in claim 1 further comprising pivot means mounting said shutter plates in said housing for pivotal movement between said open and closed positions about respective vertical pivot axes located at opposite sides of said flow passage, spring means biasing said shutter plates toward said closed position, releasable detent means in said housing for releasably holding said shutter plates in said open position, and means for releasing said detent means in response to movement of said float upwardly beyond said preselected position.

4. The invention defined in claim 3 wherein said spring means comprises a horizontally disposed annular trip plate mounted in said housing for rotation about a central vertical axis coaxial with said flow passage between a cocked and an actuated position, said pivot axes being located radially outwardly of the outer periphery of said trip plate and said shutter plates being slidable across the upper surface of said trip plate, coupling means coupling said shutter plates to said trip plate to pivot said shutter plates about their respective pivot axes from said open to said closed position in response to rotation of said plate from said cocked to said actuated position, and first spring means engaged between said housing and said trip plate resiliently biasing said trip plate toward said actuated position.

5. The invention defined in claim 4 wherein said detent means comprises a pin like detent slidably mounted in said housing, means defining a detent receiving recess in said trip plate, said detent when received within said recess being operable to retain said trip plate in said cocked position, and means operable in response to upward movement of said float for withdrawing said detent from said recess.

6. For use in combination with an underground fuel storage tank having a fill pipe projecting upwardly from said tank, a float actuated flow control valve for preventing the flow of fuel through said fill pipe into said tank when the level of fuel within said tank exceeds a predetermined level, said valve comprising a valve housing having a fuel inlet at its upper end opening into an inlet chamber within said housing and a bore extending vertically downwardly through said housing from the bottom of said chamber to define a fuel flow passage, an elongate hollow tubular conduit threadably received within said bore and projecting vertically downwardly from said housing to define a continuation of said flow passage, means adjacent the bottom of said housing for mounting said housing on the top of said fill pipe with said conduit projecting freely downwardly through said fill pipe and the lower end portion of said conduit located within the interior of said tank, a hollow cylindrical float slidably mounted on the lower end of said conduit for vertical movement relative to said conduit, said float having an outer diameter less than the inner diameter of said fill pipe, shutter valve means mounted in said housing at the bottom of said chamber for movement in a horizontal general plane between an open position accommodating the flow of fuel from said chamber into said flow passage and a closed position wherein said valve means prevents the flow of fuel from said chamber into said flow passage, detent means in said housing for releasably retaining said valve means in said open position, and actuating means operable in response to movement of said float upwardly on said conduit to a preselected position for releasing said detent means and driving said valve means to said closed position.

7. The invention defined in claim 6 wherein said shutter valve means comprises a pair of shutter plates mounted at the bottom of said chamber for pivotal movement about respective vertical pivotal axes located at diametrically opposite sides of said bore, and said actuating means comprises an annular trip plate mounted in said housing in underlying relationship to said shutter plates for sliding rotary movement relative to said housing upon a first surface of said housing defining a portion of the bottom of said chamber between a cocked position and an actuated position, spring means biasing said actuating means to said actuated position, coupling means coupling said shutter plates to said actuating means for movement therewith from said closed position to said open position upon movement of said actuating means from said cocked position to said actuated position, said detent means being operable to releasably retain said actuating means in said cocked position.

8. The invention defined in claim 7 comprising manually operable means accessible at the exterior of said housing for shifting said actuating member from said actuated position to said cocked position.

9. The invention defined in claim 7 wherein said trip plate comprises an annular plate mounted in coaxial relationship to said bore for rotation about the vertical axis of said bore between said cocked and said actuated position, said annular plate having a flat upper surface and central opening therethrough aligned with said bore to establish fluid communication between said chamber and said passage when said shutter plates are in said open position, said shutter plates being slidably supported on said upper surface of said annular trip plate and being withdrawn clear of said central opening when in said open position and overlying said opening when in said closed position.

10. The invention defined in claim 9 wherein said coupling means comprises a drive pin fixed to and projecting downwardly from each of said shutter plates, and means defining a pair of pin receiving slots in the upper surface of said annular plate respectively receiving the drive pins of said shutter plates, said slots being oriented to drive said drive pins about the pivot axes of their respective shutter plates upon rotation of said trip plate.

11. The invention defined in claim 7 wherein said detent means comprises a detent pin slidably mounted in a detent pin bore in said first surface of said housing for movement between a latching position wherein said pin projects outwardly from said first surface of said housing and a release position wherein said pin is entirely retracted into said pin bore, said actuating means having a detent pin receiving recess therein adapted to receive said detent pin when said actuating member is in said cocked position, spring means biasing said pin toward said latching position, said actuating means comprising first means on said float engageable with second means coupled to said detent pin for shifting said pin from said latching position toward said release position in response to upward movement of said float relative to said conduit.

12. The invention defined in claim 11 wherein said first surface is a horizontal surface and said actuating means is slidably supported upon said first surface, said pin projecting upwardly from said first surface when in its latching position, said second means comprising a lever mounted intermediate its ends upon said housing for pivotal movement about a horizontal axis, one end of said lever being engaged with said detent pin, and said first means on said float comprises a push rod projecting vertically upwardly from said float and engageable with the other end of said lever.

13. For use in combination with a liquid storage tank having an inlet opening in its top, a float actuated valve for stopping the flow of liquid into said tank via said inlet opening when the level of liquid in said tank rises to a selected level, said valve comprising a housing having a central bore extending vertically downwardly therethrough, a vertically elongate hollow drop tube fixed to the bottom of said housing with the interior of said tube constituting a downward extension of said bore, means for sealingly mounting said housing to the top of said tank with said drop tube projecting freely through said inlet opening downwardly into the interior of said tank, said housing having means therein defining a horizontal shoulder extending radially outwardly from said bore within the interior of said housing, an annular trip plate mounted on said shoulder in coaxial relationship to said bore for rotation relative to said housing about the axis of said bore, said trip plate having a central passage therethrough opening into said bore, a pair of shutter plates mounted in said housing for movement horizontally across the upper surface of said trip plate between an open position withdrawn clear of said central passage at opposite sides thereof and a fully closed position wherein said shutter plates cooperatively overlie and block said central passage, drive means coupling said shutter plates to said trip plate for driving said shutter plates in movement between said open and closed positions in response to rotation of said trip plate about said axis of said bore, a lower float slidably mounted on the exterior of said drop tube adjacent the lower end of said tube, an upper float slidably mounted on the exterior of said drop tube above said lower float, first trip plate actuating means operable in response to movement of said lower float upwardly above a predetermined first level for rotating said trip plate to drive said shutter plates from said open position to a partially closed position wherein said plates cooperatively overlie a portion of said central passage, and second trip plate actuating means operable in response to movement of said upper float upwardly above a second predetermined level above said first level for rotating said trip plate to drive said shutter plates from said partially closed position to said fully closed position.

14. The invention defined in claim 13 wherein said first and said second actuating means comprise respective first and second retractable detent means in said housing engageable with said trip plate to releasably retain said trip plate respectively in said open and said partially closed position, and spring means engaged between said housing and said trip plate resiliently biasing said trip plate toward said closed position.

15. The invention defined in claim 14 wherein each of said first and second detent means comprises a detent pin slidably received in a vertical pin bore in said housing opening upwardly through said shoulder beneath said trip plate, means defining first and second recesses in the bottom of said trip plate respectively adapted to receive the detent pins of said first and second detent means, spring means biasing each detent pin upwardly within its pin bore, first retracting means operable in response to upward movement of said lower float for retracting the detent pin of said first detent means into its pin bore, and second retracting means operable in response to upward movement of said upper float for retracting the detent pin of said second detent means into its pin bore.

16. The invention defined in claim 15 wherein each of said first and second retracting means each comprise a lever pivotally mounted in said housing and having a one end engaged in the associated detent pin, and a push rod extending vertically upwardly from the associated float engageable with the opposite end of said lever to move said opposite end upwardly in response to upward movement of the float.

17. The invention defined in claim 16 wherein said push rods are slidably received in vertical rod bores in said housing opening upwardly through said shoulder, the push rod of said second retracting means having a lever receiving slot extending downwardly from its upper end to a slot bottom engageable with the opposite end of the associated lever, said slot having a depth such that said upper end of said push rod of said second retracting means projects upwardly above said shoulder into a third recess in the bottom of said trip plate when the detent pin of said second actuating means is retracted into said bore.

18. The invention defined in claim 13 further comprising means defining an upwardly opening circular groove in said shoulder beneath said trip plate coaxial with the axis of said bore, an elongate compression spring located in said groove and extending circumferentially of the axis of said bore, a fixed stop in said groove engaged with one end of said spring and a pin on said trip plate projecting downwardly into said groove and engaged with the other end of said spring whereby said spring resiliently biases said trip plate in a first rotative direction about the axis of said bore, said first and second actuating means comprising releasable detent means for releasably retaining said trip plate in rotative positions respectively locating said shutter plates in said closed and said partially closed positions against the biasing action of said spring.

19. The invention defined in claim 18 wherein said second actuating means further comprises latch means for latching said trip plate against rotation in a direction opposite to said first rotative direction when said shutter plates are in said closed position.

20. The invention defined in claim 19 wherein said latch means are mounted on said upper float to latch said trip plate against rotation when said upper float is at or above said second level.

21. The invention defined in claim 18 further comprising manually operable reset means for rotating said trip plate against the biasing action of said spring to reset said shutter plates in said open position.

22. The invention defined in claim 21 wherein said reset means comprises a reset pin fixed to and projecting upwardly from said trip plate, a plunger slidably mounted in said housing for horizontal reciprocating movement between a normally maintained retracted position and an extended position and being operable during movement to said extended position to engage said trip plate and rotate said trip plate in a direction opposite said first direction, and manually operable means accessible at the exterior of said housing for driving said plunger in said reciprocating movement.

* * * * *